United States Patent [19]

Job

[11] Patent Number: 4,710,482

[45] Date of Patent: Dec. 1, 1987

[54] OLEFIN POLYMERIZATION CATALYST COMPONENT

[75] Inventor: Robert C. Job, Houston, Tex.

[73] Assignee: Shell Oil Company, Houston, Tex.

[21] Appl. No.: 875,845

[22] Filed: Jun. 18, 1986

[51] Int. Cl.$^4$ ............................................. C08F 4/64
[52] U.S. Cl. ................................. 502/127; 502/118; 502/121; 502/123; 502/124; 502/125; 502/126; 502/128; 502/133; 502/134; 526/125; 568/700
[58] Field of Search ............... 502/118, 121, 123, 124, 502/125, 126, 127, 133, 134, 128

[56] References Cited

U.S. PATENT DOCUMENTS

| | | | |
|---|---|---|---|
| 3,135,809 | 6/1964 | Bosmajian | 502/103 X |
| 4,328,328 | 5/1982 | Minami et al. | 502/125 X |
| 4,329,253 | 5/1982 | Goodall et al. | 502/125 X |
| 4,393,182 | 7/1983 | Goodall et al. | 526/125 |
| 4,400,302 | 8/1983 | Goodall et al. | 502/125 X |
| 4,414,132 | 11/1983 | Goodall et al. | 502/125 X |
| 4,451,688 | 5/1984 | Kuroda et al. | 502/125 X |
| 4,465,783 | 8/1984 | McKenzie | 502/134 X |
| 4,478,952 | 10/1984 | Mack et al. | 502/110 |
| 4,540,679 | 9/1985 | Arzoumanidis et al. | 502/127 X |
| 4,547,476 | 10/1985 | Terano et al. | 502/125 X |

FOREIGN PATENT DOCUMENTS 2101610 1/1983 United Kingdom .

OTHER PUBLICATIONS

"Alkoxymagnesium Halides", by N. Ya. Turova & E. P. Turevskaya, *J. of Organometal. Chemistry*, 42 (1972), pp. 8–17.

*Primary Examiner*—Patrick P. Garvin
*Attorney, Agent, or Firm*—Dean F. Vance

[57] ABSTRACT

Olefin polymerization catalyst components having improved activity and morphological properties are disclosed and claimed. In particular, the components are prepared by reacting a magnesium compound of the formula $[Mg_4(OR)_6(R'OH)_{10}]X$ where "X" is a counter ion having a total charge of −2 and R and R', which may be the same or different, are selected from alkyl groups of 1 to 4 carbon atoms, with a halogenated tetravalent titanium component, a halohydrocarbon component and an electron donor.

14 Claims, 2 Drawing Figures

TERNARY PHASE DIAGRAM FOR
THE SYSTEM:
MAGNESIUM METHOXIDE/MAGNESIUM
CHLORIDE/METHANOL

OLEFIN POLYMERIZATION CATALYST COMPONENT

FIELD OF THE INVENTION

This invention relates to a process for preparing solid olefin polymerization catalyst components having improved activity and morphological properties, the component being prepared from a magnesium compound of the formula $[Mg_4(OR)_6(R'OH)_{10}]X$.

BACKGROUND OF THE INVENTION

Numerous proposals are known from the prior art to provide olefin polymerization catalysts by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalyst of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-paramethoxybenzoate(ethyl anisate) or methyl-p-toluate.

While the selection of cocatalyst and selectivity control agent affects the performance of those catalyst systems, the component which appears to be subject to most significant improvement with respect to activity and productivity of the system is the procatalyst.

Preferred methods of preparing such procatalysts are claimed in U.S. Pat. Nos. 4,329,253; 4,393,182; 4,400,302; 4,328,328; 4,478,952 and 4,414,132. These procatalysts are highly active and stereospecific. The typical manner of preparing such procatalysts involves the reaction of the magnesium compound, titanium tetrachloride and electron donor in the presence of a halohydrocarbon. The resulting solid particles are then contacted with additional quantities of $TiCl_4$ and are completed by washing off excess $TiCl_4$ using light hydrocarbons (e.g., isooctane and isopentane) and drying.

The procatalysts described above have excellent polymerization activity (polymer yield) and stereospecific performance (isotactic content). However, for some applications the polymer morphology is not ideal. In olefin polymerization, polymer morphology is known to be a replica of catalyst morphology. Still further, the procatalyst morphology also depends upon the morphology of the starting magnesium compound. Accordingly, if one desires to have optimal catalyst morphology (e.g. spheroidal particles), then it is desirable to employ starting magnesium compounds of the same morphology.

A number of different approaches to improved morphology are suggested in the patent literature. One approach, disclosed in GB Pat. No. 2,101,610, involves reacting a solid particulate material with an organic magnesium compound, treating the supported magnesium composition with oxygen, carbon dioxide or a hydroxyl compound, reacting the treated product with a carbonyl compound and simultaneously or subsequently reacting with a transition metal compound. Another approach, disclosed in U.S. Pat. No. 4,465,783, involves the spray drying of a transition metal composition, or a support for a transition metal compound, suspended in a liquid medium. Still another method is disclosed in DE Pat. No. 2,839,188, where solid magnesium dialkoxide particles are dispersed into a suitable liquid phase, followed by spray-drying. However, the process of the '188 patent is not attractive as the dispersed solid particles will tend to clog the fine orifices of the spray-drying equipment and will foul the pumping and metering systems. In U.S. Pat. No. 4,540,679, use is made of a magnesium hydrocarbyl carbonate support. In the '679 patent, a suspension of magnesium alcoholate with carbon dioxide is reacted with a transition metal component to precipitate a "magnesium hydrocarbyl carbonate" support. The patentees use a number of techniques, including prepolymerization and the use of triethyl aluminum (TEA) to remove ethanol, to improve productivity. However, these techniques are not desirable—e.g., prepolymerization is an additional step and the addition of TEA adds ash to the polymer product.

The above-mentioned approaches to morphology control all depend upon starting from roughly spherical amorphous, non-stoichiometric shapes. A new method to improve morphology is greatly desired.

A new approach has now been found, unique in that the magnesium precursor is a crystalline compound of well defined stoichiometry and shape, and that permits the preparation of procatalyst particles having not only excellent productivity and selectivity, but also possessing excellent morphology.

SUMMARY OF THE INVENTION

The present invention relates to an improved solid catalyst component for the polymerization of alpha-olefins. In particular, the present invention relates to a solid magnesium halide/titanium halide catalyst component useful for the polymerization of alphaolefins which has been obtained by (a) contacting a magnesium compound of the formula [Mg$_4$(OR)$_6$(R'OH)$_{10}$]X where X is a counter ion having a total charge of −2 and R and R', which may be the same or different, are selected from alkyl groups of 1 to 4 carbon atoms with a halide of tetravalent titanium in the presence of an electron donor;

(b) contacting the resulting halogenated product with a tetravalent titanium halide;

(c) washing the resulting product to remove unreacted titanium compounds; and (d) recovering the solid product.

In a preferred embodiment the magnesium compound is a crystal having the formula [Mg$_4$(OCH$_3$)$_6$(CH$_3$OH)$_{10}$]Cl$_2$. This compound has a crystal habit which is an essentially regular rhombic dodecahedron. An advantage of such a structure is that it is essentially tangential to a spherical surface. As shown in the examples which follow, propylene polymers made with catalysts according to the present invention have high bulk densities up to and greater than 0.4 grams per cubic centimeter.

Also, as shown in the examples, the catalysts of the present invention possess an unexpected balance of excellent catalytic properties, including:
high activity
high selectivity to isotactic structures
good resin shape (morphology)
low catalytic decay
high bulk density
greater productivity per reactor volume
narrow range of particle distribution, including low fines.

Another advantage is that the alkoxy species in the catalyst appears to be resident on the Mg instead of the Ti as with catalysts of prior art prepared from magnesium ethoxide, which may help to explain the high activity of this catalyst.

There are a number of important aspects to the present invention. One, as mentioned above, relates to the dodecahedron structure. FIG. 1 shows the molecular structure of the dication, where the blackened circles are Mg, the small open circles are methoxy (OCH$_3$) and the large open circles are methanol (CH$_3$OH). Note that two chloride ions serve only to balance the positive charge but are not essential to the molecular structure.

Another important aspect relates to the method by which the stable magnesium crystal is prepared. FIG. 2 shows a ternary phase diagram for the system magnesium methoxide, magnesium chloride, methanol. Until this invention the narrow triangle ABC was the only region which can be employed to achieve the stable crystal Mg$_4$(OMe)$_6$Cl$_2$·10MeOH. More about the method to prepare the crystal will be explained in the Detailed Description of the Invention.

Another important aspect of the invention relates to the preparation of the halogenated product from the starting magnesium crystal. This halogenation takes place in the presence of a tetravalent titanium halide (e.g. TiCl$_4$) and an electron donor (e.g. an ester of an aromatic carboxylic acid). As shown in the examples, it is also much preferred that the halogenation also take place in the presence of a halohydrocarbon (e.g. chlorobenzene).

Other important aspects of the present invention will become apparent from the further description which follows.

DETAILED DESCRIPTION OF THE INVENTION

The key aspect of the present invention involves the use and preparation of a magnesium compound of the formula [Mg$_4$(OR)$_6$(ROH)$_{10}$]X, where X is a counter ion having a total charge of −2 and R is an alkyl group of 1 to 4 carbon atoms. In a preferred embodiment X is selected from the group consisting of Cl$_2^=$, I$_2^=$, Br$_2^=$, SO$_4^=$ and C$_2$O$_4^=$. Much preferably X is Cl$_2^=$. R is preferably CH$_2$CH$_3$ or CH$_3$, with CH$_3$ being much preferred.

Figure 1:
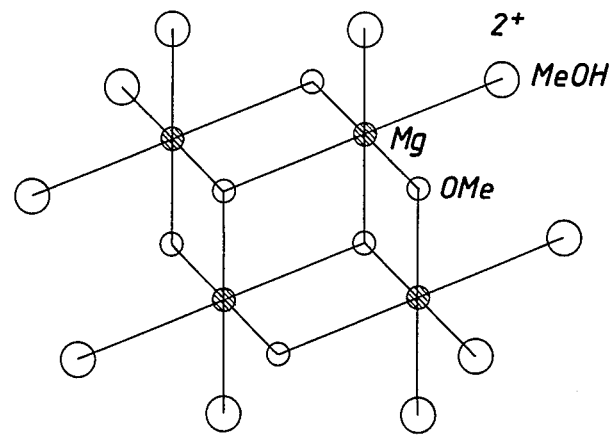
Figure 2:
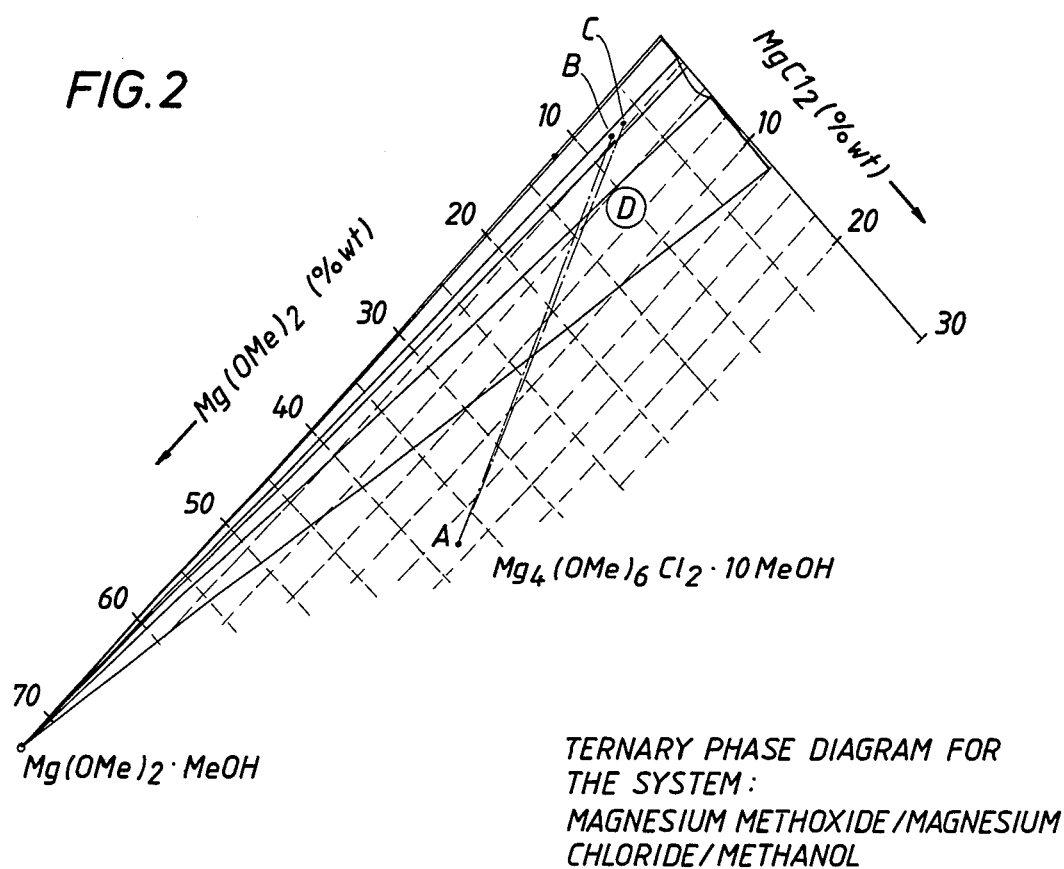

There are a number of means to prepare such starting magnesium compounds. One way is disclosed in the article "Alkoxymagnesium Halides" by Turova et al, Journal of Organometallic Chemistry 42, pages 9–17 (1972), which disclosure is herein incorporated by reference. The phase diagram shown in the attached FIG. 2 is taken from FIG. 1 of the Turova article.

As mentioned above it is much preferred that the "R" and "R'" in the crystal structure be a methyl group. Accordingly, the remainder of the disclosure will reference methanol, methyl or methoxy groups.

One method to prepare the crystal structures of the present invention (as disclosed in Turova et al) involves preparing solutions of MgCl$_2$ in methanol and Mg(OCH$_3$)$_2$ in methanol, then mixing the controlled solutions in a mole ratio of MgCl$_2$ to Mg(OCH$_3$)$_2$ of 1:3 and then removing the methanol solvent until the crystals are formed. If desired small amounts of vaseline oil may be added to improve crystallization.

Another equivalent method disclosed herein involves the use of Mg metal, MgCl$_2$ and methanol. In this method three equivalents of the Mg is dissolved in a methanolic solution of MgCl$_2$ to again provide the 3:1 mole ratio of methoxide to chloride.

The extremely narrow stability range required by the ternary phase relationship would tend to make either of the above methods difficult for commercial implementation. As discussed in the above-mentioned article by Turova, it requires great care to control solution concentrations and conditions to prepare stable crystal structures. Such care may be possible under laboratory conditions, but such level of care may be very difficult under commercial plant conditions. Accordingly, applicant has also discovered a method for preparing such structures by using a "buffer" technique. In this technique advantage is taken of the nearly equivalent lability of the Si—OCH$_3$ and Si—Cl bonds to use SiCl$_4$ to remove excess methoxide and virtually buffer the methanolic solution over a wide range of effective chloride concentration. This equilibria is shown in the following equation where one or more of the successive K$_1$, K$_2$, K$_3$, K$_4$ equilibria (eqn 3) is used to buffer the solutions:

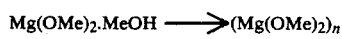

Eq. 2

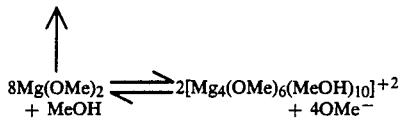

$$8Mg(OMe)_2 + MeOH \rightleftharpoons 2[Mg_4(OMe)_6(MeOH)_{10}]^{+2} + 4OMe^- \quad \text{Eq. 1}$$

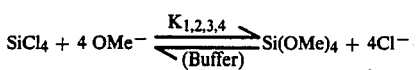

$$SiCl_4 + 4 OMe^- \underset{\text{(Buffer)}}{\overset{K_{1,2,3,4}}{\rightleftharpoons}} Si(OMe)_4 + 4Cl^- \quad \text{Eq. 3}$$

In Equation 1, magnesium methoxide and methanol are put in solution. If conditions are not right, then as shown in Equation 2, $Mg(OCH_3)_2MeOH$ precipitate occurs. If concentrations are extremely high, this precipitate occurs as $[Mg(OCH_3)_2]_n$. However, if as shown in Equation 3, $SiCl_4$ is added to the system, then it is possible to operate effectively in a wide range of concentrations outside of the narrow wedge (ABC) described in Turova. This is shown in FIG. 2 by circle D which represents the effective methoxy/chloro concentrations of examples 5 and 6 below. This buffering approach effectively opens the wedge by moving the line AC to the right.

Materials other than just $SiCl_4$ can be used to buffer the solution. Anything that can abstract methoxy and does not provide an anion so large as to seriously distort the crystal shape may be used. These compounds include silicon tetrabromide, oxalic acid, acetic acid and formic acid.

In addition to $Mg(OCH_3)_2$, other starting components include halogen containing magnesium compounds and magnesium dialkoxides.

Examples of halogen containing magnesium compounds that can be used as starting materials for the reaction are alkoxy magnesium halides, such as isobutoxy magnesium chloride, ethoxy magnesium chloride, and ethoxy magnesium bromide.

Preferred magnesium compounds are magnesium dialkoxides. In such compounds the alkoxide groups suitable have from 1 to 4 carbon atoms. Examples of these preferred groups of compounds are magnesium di-isopropoxide, magnesium diethoxide, magnesium dibutoxide, and ethoxy magnesium isobutoxide. Magnesium dimethoxide is particularly preferred.

Another aspect of the present invention involves removing a portion (or all) of the methanol from the crystal. This may be done by boiling the crystal in an inert liquid hydrocarbon, e.g. isooctane. Any liquid hydrocarbon that forms azeotropes with methanol may be used. The advantage of this approach is to decrease the Ti level by decreasing the amount of sparingly soluble (Cl)(OMe)Ti species.

Once the uniformly optimized particles of the magnesium compound have been obtained, it is then necessary to convert the compounds to magnesium halides in a metathesis reaction (digestion), such as that disclosed in U.S. Pat. No. 4,414,132.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e., yielding magnesium halides in which the atomic ratio of halogen to magnesium is at least 1.5. The most preferred reactions are those leading to fully halogenated reaction products, i.e., magnesium-dihalides. Such halogenation reactions are suitably effected by employing a molar ratio of magnesium compound to titanium compound of 0.005:1 to 2:1, preferably 0.01:1 to 1:1. These halogenation reactions are conducted in the additional presence of a halohydrocarbon and an electron donor. An inert hydrocarbon diluent or solvent may also be present. When using an inert diluent or solvent, this should of course not be used as a complete substitute for the halohydrocarbon, for, as shown in the examples, it is important that the halogenation reaction proceeds in the presence of a halohydrocarbon.

Suitable halides of tetravalent titanium include aryloxy- or alkoxy-di- and trihalides, such as dihexanoxy-titanium dichloride, diethoxy-titanium dibromide, isopropoxy-titanium tri-iodide and phenoxy-titanium trichloride, titanium tetrahalides are preferred; most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons.

Suitable electron donors which are used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters, diesters and diamines, particularly esters and diesters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, isobutyl phthalate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,2,5,5-tetramethyl piperidine and similar compounds. The electron donors may be used singly or in combination. Preferred electron donors for use in preparing the titanium constituent are ethyl benzoate and isobutyl phthalate.

The halogenation normally proceeds under formation of a solid reaction product which may be isolated from the liquid reaction medium by filtration decantation or another suitable method and may be subsequently washed with an inert hydrocarbon diluent, such as n-hexane, iso-octane or toluene, to remove any unreacted material, including physically absorbed halohydrocarbon.

Subsequent to halogenation, the product is contacted with a tetravalent titanium halide such as a dialkoxytitanium dihalide, alkoxy-titanium trihalide, phenoxytitanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium chloride is most suitably carried out at a temperature of from 60° to 136° C. during 0.1-6 hours, optionally in the presence of an inert hydrocarbon or halohydrocarbon diluent. Particularly preferred contacting temperatures are from 70° to 120° C. and the most preferred contacting periods are between 0.5 to 3.5 hours. The treatment may be carried out in successive contacts of the solid with separate portions of $TiCl_4$, which may contain suitable electron donors chosen from the previous list.

The preferred halogen atom, possibly contained in the magnesium compound to be halogenated, and contained in the titanium compound which serves as halogenating agent and in the tetravalent titanium halide with which the halogenated product is contacted, is chlorine.

After the treatment with tetravalent titanium halide the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent.

The material used to wash the catalyst component is an inert, light hydrocarbon liquid. Preferred light hydrocarbon liquids are aliphatic, alicyclic and aromatic hydrocarbons. Examples of such liquids include iso-pentane, n-hexane, iso-octane and toluene, with iso-pentane being most preferred.

The amount of light hydrocarbon liquid employed is 5 to 100 cc/gm of procatalyst in each of 2 to 6 separate washes, preferably about 25 cc/gm.

The resulting solid component is the procatalyst, which is used with cocatalyst and selectivity control agent in the polymerization process.

Suitable electron donors, which are used in combination with or reacted with an organoaluminum compound as selectivity control agents and which are also used in the preparation of the solid catalyst component are ethers, esters, ketones, phenols, amines, amides, imines, nitriles, phosphines, silanes, phosphites, stilbines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and organic silicon compounds. Preferred esters are esters of aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amine hexyl benzoate, isopropyl naphthenate, n-amyl toluate, ethyl cyclohexanoate, propyl pivalate. Examples of the organic silicon compounds useful herein include alkoxysilanes and acyloxysilanes of the general formula $R^1{}_nSi(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane, phenyltrimethoxy silane and the like. The donor used as selectivity control agent in the catalyst may be the same as or different from the donor used for preparing the titanium containing constituent. Preferred electron donors for use in preparing the titanium constituent are ethyl benzoate and isobutyl phthalate. Preferred as selectivity control agent in the total catalyst is p-ethoxy ethyl benzoate, phenethyltrimethoxy silane and diphenyldimethoxy silane.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mol per mol aluminum compound, are in the range from 0.005 to 1.5, particularly from 0.1 to 0.5. Preferred portions of selectivity control agent calculated as mol per mol Ti is in the range of 0.1 to 50, particularly 0.5 to 20.

Proportions of electron donor contained in the solid catalyst component, calculated as mol per mol of magnesium, are suitably in the range of from 0.01 to 10, e.g., from 0.01 to 10 and from 0.05 to 5.0 and especially from 0.05 to 0.5.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1 to 150, and suitably from about 10 to about 150. Preferably the components are injected separately into the reactor. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

The present invention is also concerned with a process for polymerizing an alpha monoolefin such as ethylene or butylene, preferably propylene, employing the novel catalyst components and compositions. These polymerization may be carried out by any of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the novel catalyst compositions or one or more of the catalyst components to the polymerization reactor. The activity and stereospecificity of the novel catalyst compositions are so pronounced that there is no need for any catalyst removal or polymer extraction techniques. Total metal residues in the polymer, i.e., the combined aluminum, magnesium and titanium content, can be as low as 150 ppm, even less than 75 ppm.

It is well known that supported coordination procatalysts and catalyst systems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and freed of potential catalyst poisons.

The productivity of the procatalyst is determined as kg polymer/g procatalyst in a standard one or two hour batch reaction; it may also be expressed as kg polymer/g Ti. Catalyst activity is sometimes reported as kg polymer/g procatalyst/hr. If determined in a standard one hour test, activity thus is numerically the same as productivity.

The selectivity to isotactic polypropylene is determined by measuring the amount of xylene soluble polymer (XS), in accordance with regulations of the U.S. Food and Drug Administration. The XS test is carried out as follows:

The sample is completely dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 10 ml aliquot of the filtrate, drying the residue under vacuum, and weighing the residue. The xylene-solubles consist of amorphous material with some low molecular weight crystalline material. (FDA regulations 121.2501 and 1.1.2510, 1971.)

The numerical value of XS in the case of propylene homopolymer is typically about 2 percent less than the amount of polymers extractable in refluxing n-heptane. Thus the isotacticity index of polypropylene (amount insoluble in refluxing n-heptane) is approximately $100-(XS+2)$.

Catalyst productivity at standard conditions exhibits an inverse relationship with stereoselectivity. This relationship is characteristic for any given procatalyst. It is generally possible to control these variables, within limits, by changing the proportion of selectivity control agent (SCA). Increasing the amount of SCA increases selectivity to isotactic or stereoregular polymer but reduces activity, and hence productivity, in a standard one hour test.

The following examples illustrate the invention:

ILLUSTRATIVE EMBODIMENT I

Preparation of the magnesium containing precursors:

A. Preparations using exact stoichiometry (i.e. $OCH_3/Cl=3.0$).

1. (Staying within the metastable wedge.) Anhydrous magnesium chloride was dissolved in methanol and about 1/6 of the solvent distilled away. 3.0 equivalent of magnesium metal was added slowly, to maintain a gentle reflux, then the reaction kept under reflux to finish the magnesium consumption. After standing, a mixture of pumpkin shaped crystals and some grey powder was obtained. The product was slurried in a mixture of methanol/isopropanol and the grey powder decanted. After washing again with the methanol/isopropanol solution, the crystals were dried under moving nitrogen to give a recovery of 65% basis total magnesium. (Analysis: $Mg=15.5\%$, $Cl=12.2\%$, $Mg/Cl=1.85$ mol/mol). The mother liquor had the approximate composition of 8.5% $Mg(OCH_3)_2 + 3.0\%$ $MgCl_2$, a stable solution according to the ternary phase diagram.

2. (Leaving the metastable wedge by dilution.) The preparation was carried out as in example 1 except that, at the end of the reflux, an equal volume of isooctane was added to the hot methanol solution together with enough isopropanol to yield a homogeneous solution. Upon cooling, the yield of crystalline product was essentially quantitative, based on total magnesium. (Analysis: $Mg=14.1\%$, $Cl=10.4\%$, $Mg/Cl=2.0$ mol/mol). In contrast to example 1, the product appeared to be a mixture of crystalline forms.

B. Preparations using excess chloride (i.e. $OCH_3/Cl<3$).

3. (Moving outside the metastable wedge via high Cl concentration.) Commercially available magnesium chloride was dissolved in 8% commercially available methanolic magnesium methoxide (70 g $MgCl_2$ per quart of solution). After standing overnight the floculant magnesium was filtered away from the solution. 1.5 liter of the clear solution was mixed with 1.5 l of of isooctane and 0.8 l of isopropanol was added to insure homogeniety. The solution was stirred at 230 rpm with a teflon paddle stirrer. After a day, the precipitate was collected, washed with isooctane and dried under moving nitrogen. The yield, based on total magnesium, was 42%. (Analysis: $Mg=15.9\%$, $Cl=22.8\%$, $Mg/Cl=1.0$ mol/mol). The product appeared to be a mixture of well formed crystals in the 5–30 micron range.

4. Anhydrous magnesium chloride was dissolved in methanol then 1.0 equivalent of magnesium turnings was added to maintain a gentle reflux. Reflux was continued overnight then an equal volume of isooctane was added, to the hot solution, together with sufficient isopropanol to homogenize. The solution was allowed to cool, with vigorous stirring, to give spheroidal amorphous product in the size range of 20–80 microns. The yield, based on total magnesium, was 81.5%.

C. Preparation with excess chloride in the presence of $SiCl_x(OCH_3)_y$ buffer.

5. Magnesium (43 g, 1.77 mol) was added, in 5–8 g portions, to 1200 ml of methanol in a 2 l erlenmeyer flask. The solvent was heated gently to initiate the magnesium dissolution. After that, the heat of reaction was sufficient to maintain a gentle reflux. After all of the magnesium had dissolved, silicon tetrachloride (45 g, 264 mmol; 20% excess basis total Cl) was added slowly (since this presents a rather exothermic acid/base reaction). Two of these preparations were combined and sufficient methanol distilled away to bring the total volume to 1.6 to 1.7 l. The hot solution, 'A', was then poured into a 2 l reaction kettle, equipped with a large bladed paddle stirrer and stainless steel baffles, and stirred at high speed until the solution had cooled and a large mass of small crystals was obtained. The crystals were collected upon a coarse fritted funnel, washed twice with a mixture of 500 g isooctane/150 g isopropanol, washed twice with isooctane and dried under moving nitrogen for about 20 minutes. The yield was 420 g (71%). Visible and scanning electron microscopic examination reveal the product to be of a homogeneous crystal type in the shape of rhombic dodecahedrons.

6. 105 g of the hot solution 'A', from example 5, was mixed with 61 g of toluene to give a clear solution. Upon stirring overnight 8.1 g of well formed, transparent crystals, in the shape of rhombic dodecahedrons, were obtained.

In the above examples, the crystals made in Example 1 demonstrate the preparation according to the invention, and make good catalysts. Example 2 is outside the wedge ABC and does not make good catalysts. Likewise examples 3 and 4 are also outside the invention. Examples 5 and 6 show buffered systems according to the present invention.

Preparation of the Procatalysts

The procatalysts (examples 7-17) were prepared as follows: Electron donor (type and amount shown in Table 1) were added along with 150 ml of a 1:1 (vol:vol) mixture of titanium tetrachloride and chlorobenzene to 50 mmol of the appropriate magnesium precursor (Table 1) and stirred at room temperature for 15 minutes. The mixture was then stirred for an hour at 110° C. and filtered hot. The residual solid was slurried in 150 ml of the 1:1 titanium tetrachloride/chlorobenzene solution, 0.2 to 0.4 ml of phthaloyl chloride was added (U.S. Pat. No. 4,535,068), and the slurry stirred for 30-60 minutes at 110° C. After a hot filtration, the solid was slurried in 150 ml of the 1:1 titanium tetrachloride/chlorobenzene solution and stirred at 110° C. for 30 minutes and filtered hot. The reaction vessel was cooled to below 40° C. and the solid was washed 6 times with 150 ml portions of isopentane then dried for 100 minutes, at 40° C., under moving nitrogen. The titanium content of the various procatalysts is shown in Table 1.

TABLE 1

| Example # | Mg Precursor | Electron Donor | Titanium (% wt) | Comments |
|---|---|---|---|---|
| 7 | 1 | iBP (9.7 mmol) | 3.44 | |
| 8 | 1 | iBP (6.0) | 4.63 | |
| 9 | 1 | iBP (7.5) | 4.06 | |
| 10 | 1 | MpT (16.7) | 5.30 | |
| 11 | 2 | iBP (7.6) | 4.10 | |
| 12 | 3 | iBP (17.3) | 4.98 | |
| 13 | 4 | iBP (11.1) | 4.81 | |
| 14 | 5 | iBP (9.9) | 4.67 | |
| 15 | 5 | iBP (8.7) | 2.00 | The magnesium precursor was boiled in isooctane for 1 hr to remove 92% of the bound methanol. |
| 16 | 5 | iBP (8.7) | 4.49 | |
| 17 | 6 | iBP (8.7) | 4.04 | | iBP = isobutylphthalate
MpT = methyl-p-toluate

Liquid Pool (LIPP) and Gas Phase Propylene Polymerizations

LIPP polymerizations were carried out for two hours at 67° C., in a 1 gal autoclave, using 2.7 l of propylene, 132 mmol of hydrogen, and sufficient catalyst to provide 8 micromoles of titanium. Triethylaluminum (70 mol/mol Ti) was mixed with 17.5 mmol of SCA (ethyl-p-ethoxybenzoate for example #23, diphenyldimethoxysilane for all others) and either premixed with the procatalyst 5 to 30 minutes before injection or injected directly to the autoclave before procatalyst injection.

Gas phase polymerizations were carried out, for two hours at 67° C., at a pressure of 300 psig, with a 10 g/min propylene flow, in a 4 gal autoclave equipped with a ribbon stirrer. After gas flow had been established in the autoclave, the SCA was injected (17.5 mol/mol Ti) followed by the triethyl aluminum (70 mol/mol Ti) followed by the procatalyst (sufficient to provide 8 micromoles of titanium).

The results are shown in Table 2. Note that examples 23-26 are really counterexamples using catalysts prepared from magnesium chloro methoxides which are not pure $Mg_4(OMe)_6(MeOH)_{10}Cl_2$ and that is why their productivities are so much poorer than the others.

TABLE 2

| Example # | Catalyst # | Productivity (Kg PP/g cat) | X.S. (% wt) | Phase (g/l) | Morphology Details |
|---|---|---|---|---|---|
| 18 | 7 | 44.7 | 6.8 | l | |
| 19 | 7 | 24.0 | 4.5 | g | 0.37 b.d., 84.5% of polymer at 0.25-2.0 mm |
| 20 | 8 | 40.6 | 9.1 | l | 0.32 b.d., 85.6% of polymer at 0.50-2.0 mm |
| 21 | 8 | 20.4 | 13.8 | g | 0.35 b.d., 88.6% of polymer at 0.50-2.0 mm |
| 22 | 9 | 40.9 | 6.1 | l | 0.39 b.d., 87.1% of polymer at 0.25-2.0 mm |
| 23 | 10 | 18.8 (1 hr) | 7.9 | l | |
| 24 | 11 | 24.9 | 6.5 | l | |
| 25 | 12 | 6.0 | 8.5 | l | |
| 26 | 13 | 10.5 | 9.7 | l | |
| 27 | 14 | 66.1 | 7.2 | l | 0.43 b.d. |
| 28 | 14 | 15.8 | 5.4 | g | |
| 29 | 15 | 34.3 | 3.4 | l | 0.37 b.d., 84.3% of polymer at 0.25-2.0 mm |

TABLE 2-continued

| Example # | Catalyst # | Productivity (Kg PP/g cat) | X.S. (% wt) | Phase (g/l) | Morphology Details |
|---|---|---|---|---|---|
| 30 | 15 | 10.2 | 2.0 | g | |
| 31 | 16 | 46.1 | 6.2 | l | 0.39 b.d., 80.7% of polymer at 0.5–2.0 mm |
| 32 | 17 | 63.9 | 7.5 | l | 0.36 b.d. |
| 33 | 17 | 20.9 | 5.4 | g | |

"g" is gas phase polymerization
"l" is liquid phase polymerization
"b.d." is bulk density

What is claimed is:

1. A solid magnesium halide/titanium halide catalyst component useful for the polymerization of alpha olefins which has been obtained by the process comprising:
   (a) contacting a stable magnesium compound of the formula $[Mg_4(OR)_6(R'OH)_{10}]X$ where X is a counter ion having a total charge of $-2$ and R and R', which may be the same or different, are selected from alkyl groups of 1 to 4 carbon atoms with a halide of tetravalent titanium in the presence of an electron donor;
   (b) contacting the resulting halogenated product with a tetravalent titanium halide;
   (c) washing the resulting product to remove unreacted titanium compounds; and
   (d) recovering the solid product.

2. The solid component of claim 1 wherein R' is $CH_3$ and "R" is $CH_3$ and "X" is selected from the group consisting of $Cl_2=$, $I_2=$, $Br_2=$, $SO_4=$ and $C_2O_4=$.

3. The solid component of claim 2 wherein "X" is $Cl_2=$.

4. The solid component of claim 1 wherein said magnesium compound is contacted with said halide of tetravalent titanium and said electron donor also in the presence of a halohydrocarbon.

5. The solid component of claim 1 wherein said tetravalent titanium halide is $TiCl_4$.

6. The solid component of claim 4 wherein said tetravalent titanium compound is $TiCl_4$ and said halohydrocarbon is a chlorohydrocarbon.

7. The solid component of claim 3 wherein said magnesium compound is heated in an inert light hydrocarbon so as to remove a portion or all of the methanol ($CH_3OH$) groups prior to contacting with said tetravalent titanium halide.

8. The solid component of claim 7 wherein said inert light hydrocarbon is isooctane.

9. The solid component of claim 6 wherein said electron donor is an ester or diester of an aromatic carboxylic acid.

10. An olefinic polymerization catalyst composition comprising an organoaluminum compound, a selectivity control agent, and the solid catalyst component of claim 1 wherein the atomic ratio of aluminum to titanium is about 30:1 to about 100:1.

11. The composition of claim 10 wherein said organoaluminum compound is a trialkylaluminum and said selectivity control agent is selected from the group consisting of esters and diesters of aromatic carboxylic acids and silicon compounds of the general formula $R^1{}_nSi(OR^2)_{4-n}$, where n is between zero and three, $R^1$ is a hydrocarbon group or a halogen atom and $R^2$ is a hydrocarbon group.

12. The composition of claim 11 wherein said trialkylaluminum is triethyl aluminum.

13. The composition of claim 11 wherein said selectivity control agent is selected from ethyl benzoate and diisobutyl phthalate.

14. The composition of claim 11 wherein said selectivity control agent is selected from diphenyl dimethoxy silane and phenethyltrimethoxy silane.

* * * * *